No. 744,954. PATENTED NOV. 24, 1903.
E. C. BRICE.
FURNACE.
APPLICATION FILED OCT. 19, 1901.
NO MODEL. 2 SHEETS—SHEET 1.
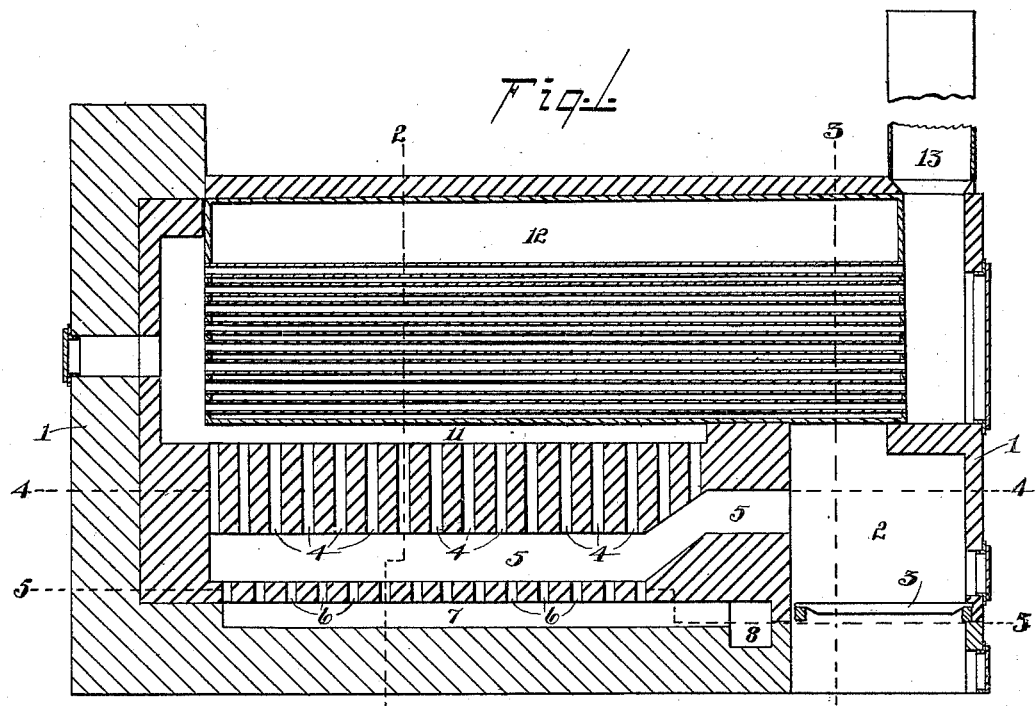
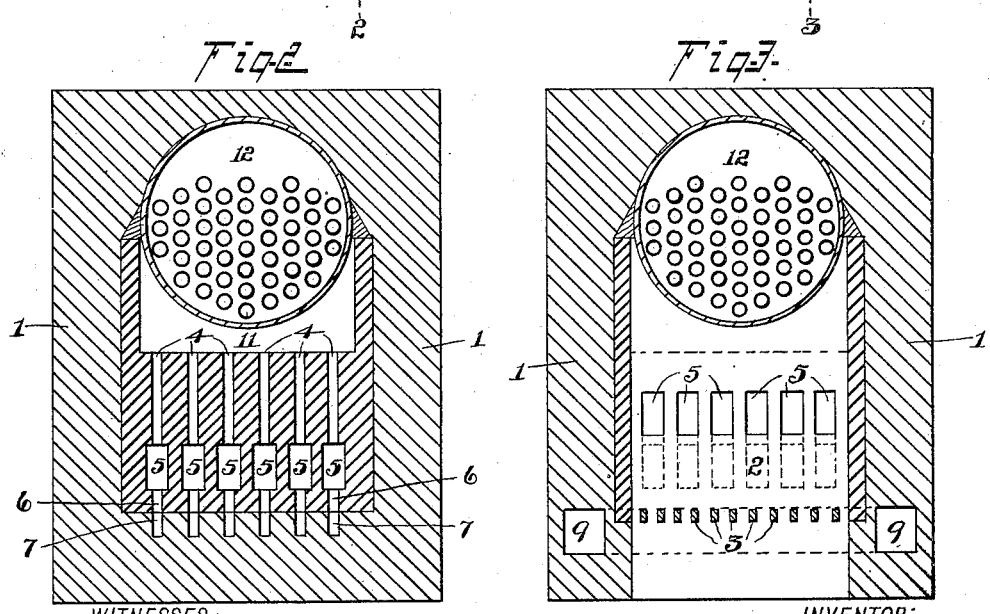
WITNESSES: INVENTOR:
Walter C. Pusey Edward C. Brice,
A. V. Groupe BY Joshua Pusey,
ATTORNEY, No. 744,954. PATENTED NOV. 24, 1903.
E. C. BRICE.
FURNACE.
APPLICATION FILED OCT. 19, 1901.
NO MODEL. 2 SHEETS—SHEET 2.
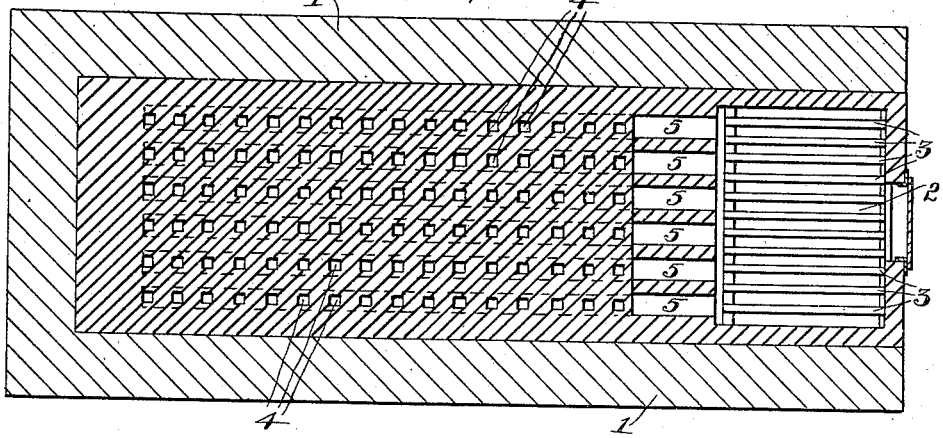
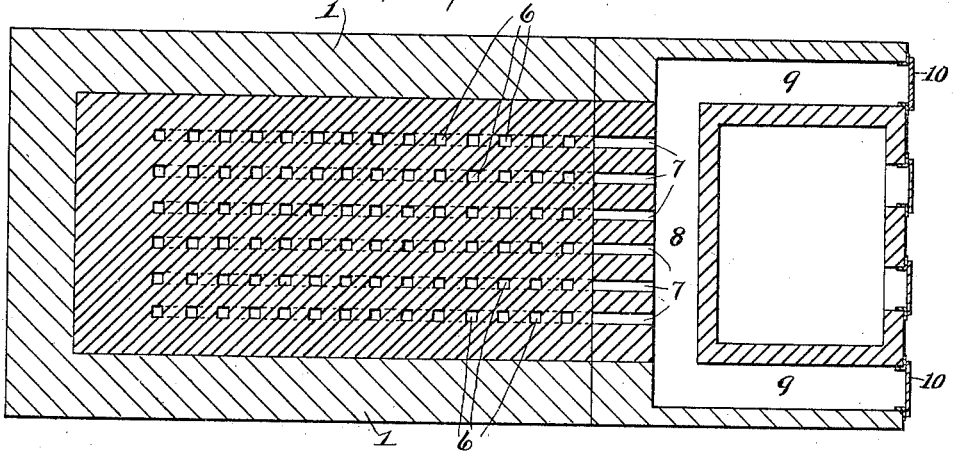
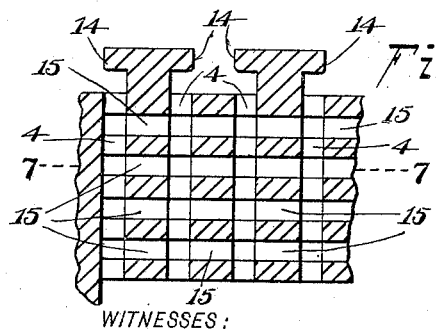
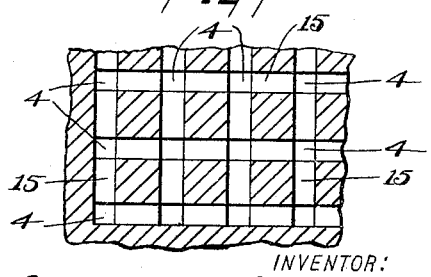
WITNESSES:
Walter C. Pusey
A. V. Groups
INVENTOR:
Edward C. Brice,
BY Joshua Pusey,
ATTORNEY.

No. 744,954.                                              Patented November 24, 1903.

UNITED STATES PATENT OFFICE.

EDWARD C. BRICE, OF COLWYN, PENNSYLVANIA.

FURNACE.

SPECIFICATION forming part of Letters Patent No. 744,954, dated November 24, 1903.

Application filed October 19, 1901. Serial No. 79,233. (No model.)

*To all whom it may concern:*

Be it known that I, EDWARD C. BRICE, a citizen of the United States, residing at Colwyn, in the county of Delaware, State of Pennsylvania, have invented certain new and useful Improvements in Furnaces, of which the following is a full, clear, and exact description, reference being had to the accompanying drawings, of which—

Figure 1 is a vertical longitudinal section. Fig. 2 is a section on line 2 2, Fig. 1. Fig. 3 is a section on line 3 3, Fig. 1. Fig. 4 is a section on line 4 4, Fig. 1. Fig. 5 is a section on line 5 5, Fig. 1. Fig. 6 is an enlarged vertical section, broken off, of the accumulator. Fig. 7 is a horizontal section on line 7 7, Fig. 6.

The object of my invention is to provide a furnace for heating a boiler or the like that shall be compact, simple in construction, and in which may be obtained a maximum temperature with a minimum consumption of coal.

The leading feature of the invention comprises a furnace having a series of elongated vertical passage-ways in a body of suitable refractory material, a series of horizontal passage-ways communicating between said vertical ones, a series of flues leading from the fire-box into which flues the lower ends of said passage-ways open, and a series of conduits for supplying and distributing air to said flues, whereby a more perfect combustion of the gases, &c., from the fuel employed is attained than in any furnace known to me and also a very high temperature, as hereinafter described.

The invention further comprises certain details of construction, also hereinafter pointed out.

Referring to the accompanying drawings, forming a part of this specification, 1 designates the outer walls of the furnace; 2, the fire-box; 3, the usual grate-bars. Within the lower portion of the space inclosed by said walls is a structure of suitable refractory material, the upper part of which, hereinafter termed the "accumulator," is provided with numerous vertical elongated passage-ways 4 and also a series of horizontal openings or passage-ways 15, some extending longitudinally and others transversely and communicating between adjacent ones of said vertical passage-ways 4, as seen in Figs. 6 and 7. Thus the accumulator is in the nature of a refractory cellular structure, the aggregate of all the horizontal passage-ways 15 being greater than that of the vertical passage-ways. I prefer to make the accumulator of the form shown—that is, an elongated square prism with the passage-ways 4 arranged in equidistant longitudinal and transverse rows. The middle portion of said structure has a series of longitudinal flues 5 that extend beneath the accumulator and open into the fire-box 2, there being a flue for each longitudinal row of the passage-ways 4, as seen in Figs. 2 and 4.

The lower part or bottom wall of the aforesaid structure is provided with a series of vertical openings 6, arranged, preferably, in rows similarly to the passage-ways 4 of the accumulator, the upper ends of the openings of one row leading into a flue 5, the next into the adjacent flue, and so on, while their lower ends open into ducts 7 in the bottom wall of the furnace, there being one duct for each row of the said openings. These ducts communicate with an enlarged conduit 8 in the wall of the furnace, which conduit has limbs 9, at the outer ends of which are doors 10.

The flues 5, as shown in Fig. 1, open into the fire-box at an elevation sufficient to prevent the entrance of fuel or ashes from the fire-box, which would otherwise more or less clog up the mouth of the flues. The latter are deflected downwardly a short distance to the rear of the fire-box and are then continued horizontally, as seen in Fig. 1. This is merely for the purpose of economizing space.

The upper part or ends of the passage-ways 4 of the accumulator open into a closed space or chamber 11, which may be termed the "heating-chamber," in which is supported a suitable distance above the accumulator a boiler 12, tubular in this instance, or other thing or structure to be heated.

13 is the smoke-stack.

Having thus described the construction of my invention, I shall now describe the manner of its operation, as follows: When a fire is first started in the fire-box, the doors 10 of the limbs 9 of conduit 8 are closed. The gases and solid products of the partial combustion of the coal or other fuel are drawn into the flues 5 and thence up through the passage-ways 4, and so heating the accumulator. When the latter has become heated up to a cherry-red or glowing temperature, the air-conduit doors 10 are opened, whereupon the air flows into the ducts 7, thence through the openings 6 into the flues 5, said openings distributing the air along the length of the flues. This air supplies oxygen to the gases, &c., flowing into the flues 5, and as the same enters the passage-ways 4 and comes into contact with the highly-heated walls of the accumulator a perfect combustion of the gases, &c., takes place and there occurs a continuous series of pulsations, caused by the instantly recurring explosions of the oxygen and gases resulting from the chemical combination taking place. These explosions appear to take place mainly in the passage-ways 15, which are in the nature of "cells" the walls of which soon become intensely heated. Thus the temperature of the accumulator increases, and the heat being, as it were, accumulated therein is subsequently maintained and the boiler is heated, not only by the heat radiated by it, but to a greater extent by the numerous intensely-hot points of flame from the series of vertical passage-ways impinging directly against the lower part of the boiler, as well as by the very hot incombustible gas or mingled gas and air that passes on to the smoke-stack 13 through the boiler-tubes.

It will be understood that before the accumulator has become red-hot and before the air is admitted into the flues by way of the ducts 7 and openings 6 the furnace operates similarly to an ordinary furnace, except that the accumulator then (as well as with the admission of air) performs the important function of effecting a substantially equal distribution of heat over its area.

When it is desired to cool off the furnace, it may be rapidly done by drawing the fire and opening the doors 10 of the conduit 8. If, however, it should be desirable to maintain steam in the boiler for a period of time after the fire has been drawn, this may be accomplished by after having drawn the fire closing all the doors of the furnace, including doors 10, and the heat accumulated in the accumulator will by radiation heat the boiler for a considerable time. The accumulator also acts as an obstruction to retain heat that would otherwise escape by way of the stack by reason of the strong draft.

In order to prevent the points of flame from the passage-ways 4 from coming too directly into contact with the boiler, and thus possibly injuring the same, I sometimes provide a deflector 14, that projects as a hood a short distance above and over the upper end of the respective passage-ways 4, as seen in Fig. 6, whereby the flames are deflected laterally before coming into contact with the boiler.

I remark that I am aware of the fact that there have been described furnaces having a structure of refractory material with passage-ways communicating with the fire-box and also with a heating-chamber, there being also conduits leading directly into these passage-ways for supplying external air thereto. It is to be observed, however, that in my construction, as hereinbefore described, a suitable quantity of air is supplied to flues communicating with the passage-ways of the accumulator, in which flues the air is mingled with the hot gases, &c., from the furnace, which heated mixture is exploded upon rising and coming into contact with the intensely-heated walls of said passage-ways, the said flues being, thus in effect, mixing-chambers for the air and gases, &c.

Having thus described my invention, I claim as new and desire to secure by Letters Patent—

1. A furnace, comprising a fire-box, the flues leading from the interior thereof, the accumulator consisting of the structure of refractory material having the series of vertical passage-ways communicating with said flues, and having also the longitudinal and transverse passage-ways communicating with said vertical passage-ways, and means for supplying air to said flues, substantially as and for the purpose set forth.

2. A furnace, comprising the fire-box, the flues leading from the interior thereof, the accumulator consisting of the structure of refractory material having the series of vertical passage-ways communicating with said flues, and having also the longitudinal and transverse passage-ways communicating with said vertical passage-ways, the ducts, the series of openings leading therefrom into said flues for distributing air to the latter, substantially as and for the purpose set forth.

In testimony whereof I have hereunto affixed my signature this 15th day of October, A. D. 1901.

EDWARD C. BRICE.

Witnesses:
BENJ. W. WILSON,
WALTER C. PUSEY.